United States Patent
Pang

(10) Patent No.: US 8,739,045 B2
(45) Date of Patent: May 27, 2014

(54) SYSTEM AND METHOD FOR MANAGING CONVERSATIONS FOR A MEETING SESSION IN A NETWORK ENVIRONMENT

(75) Inventor: Tak Ming Francis Pang, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 207 days.

(21) Appl. No.: 13/039,065

(22) Filed: Mar. 2, 2011

(65) Prior Publication Data

US 2012/0226997 A1   Sep. 6, 2012

(51) Int. Cl.
*G06F 3/00* (2006.01)
*G06F 3/048* (2013.01)

(52) U.S. Cl.
USPC .......................... 715/753; 715/855

(58) Field of Classification Search
USPC .................. 715/753, 855
See application file for complete search history.

(56) References Cited

U.S. PATENT DOCUMENTS

| | | | |
|---|---|---|---|
| 7,330,541 B1* | 2/2008 | Surazski et al. | 379/202.01 |
| 8,290,134 B2* | 10/2012 | Jaiswal et al. | 379/202.01 |
| 2004/0028199 A1* | 2/2004 | Carlson | 379/93.21 |
| 2005/0018828 A1* | 1/2005 | Nierhaus et al. | 379/202.01 |
| 2006/0050658 A1* | 3/2006 | Shaffer et al. | 370/261 |
| 2007/0038701 A1* | 2/2007 | Majors et al. | 709/204 |
| 2007/0067387 A1* | 3/2007 | Jain et al. | 709/204 |
| 2007/0263821 A1* | 11/2007 | Shaffer et al. | 379/202.01 |
| 2007/0263824 A1* | 11/2007 | Bangalore et al. | 379/202.01 |
| 2008/0212499 A1* | 9/2008 | Maes | 370/265 |
| 2011/0149013 A1* | 6/2011 | Khot et al. | 348/14.09 |
| 2011/0280387 A1* | 11/2011 | Soo et al. | 379/202.01 |
| 2012/0163577 A1* | 6/2012 | Buford et al. | 379/202.01 |
| 2012/0182384 A1* | 7/2012 | Anderson et al. | 348/14.09 |

OTHER PUBLICATIONS

Cisco WebEx WebEx Meeting Center User Guide for Hosts, Presenters, and Participants 8.17 last updated Jul. 23, 2010 390 pages.*
WebEx Meeting Center 7 Getting Started with WebEx Meeting Center last updated Jan. 16, 2006 47 pages.*
FrontRow Student Microphone Wayback Machine archived date Sep. 9, 2010 5 pages.*
Ralph Swick W3C The Zakim IRC Teleconference Agent Apr. 11, 2007 18 pages.*
Batipi Conference Call Feature Wayback Machine Archived date Aug. 12, 2010 6 pages.*
Rochelle Mazar and jason Nolan "Hacking Say and Reviving ELIZA: Lessons from Virtual Environments" 2008 6 pages.*

(Continued)

Primary Examiner — Andrea Long

(57) ABSTRACT

An example method is provided and includes establishing a communication session involving a first endpoint and a second endpoint associated with a meeting in a network environment. The first endpoint is associated with a first identifier and the second endpoint being associated with a second identifier. The method also includes designating the first endpoint as a speaking leader for a segment of the communication session, the second endpoint operates in a listening mode while the first endpoint operates as the speaking leader. The method also includes rendering a symbol indicative of the first endpoint being the speaking leader for the segment. The symbol and the first identifier are associated on a user interface.

21 Claims, 7 Drawing Sheets

(56) References Cited

OTHER PUBLICATIONS

Ines Beier and Hartmut Koenig. 1999. Distributed QoS Management for a Multiparty Video Conferencing System. In Proceedings of the IFIP TC6 WG6.7 Fifth International Conference on Intelligence in Networks (SMARTNET '99), Thongchai Yongchareon, Finn Arve Aagesen, and Vilas Wuwongse (Eds.). Kluwer, B.V., Deventer, The Netherlands, The Netherland.*

Mark Veverka, "Patently Important," Jun. 19, 2010; © 2011 Dow Jones & Company, Inc.; 3 pages; http://online.barrons.com/article/SB50001424052970203296004575314402596370046.html.

Ravinder Singh Taneja, "The Talking Stick Colloquium," [retrieved and printed Mar. 2, 2011]; 8 pages; http://www.sikhchic.com/article-detail.php?id=1204&cat=29.

* cited by examiner

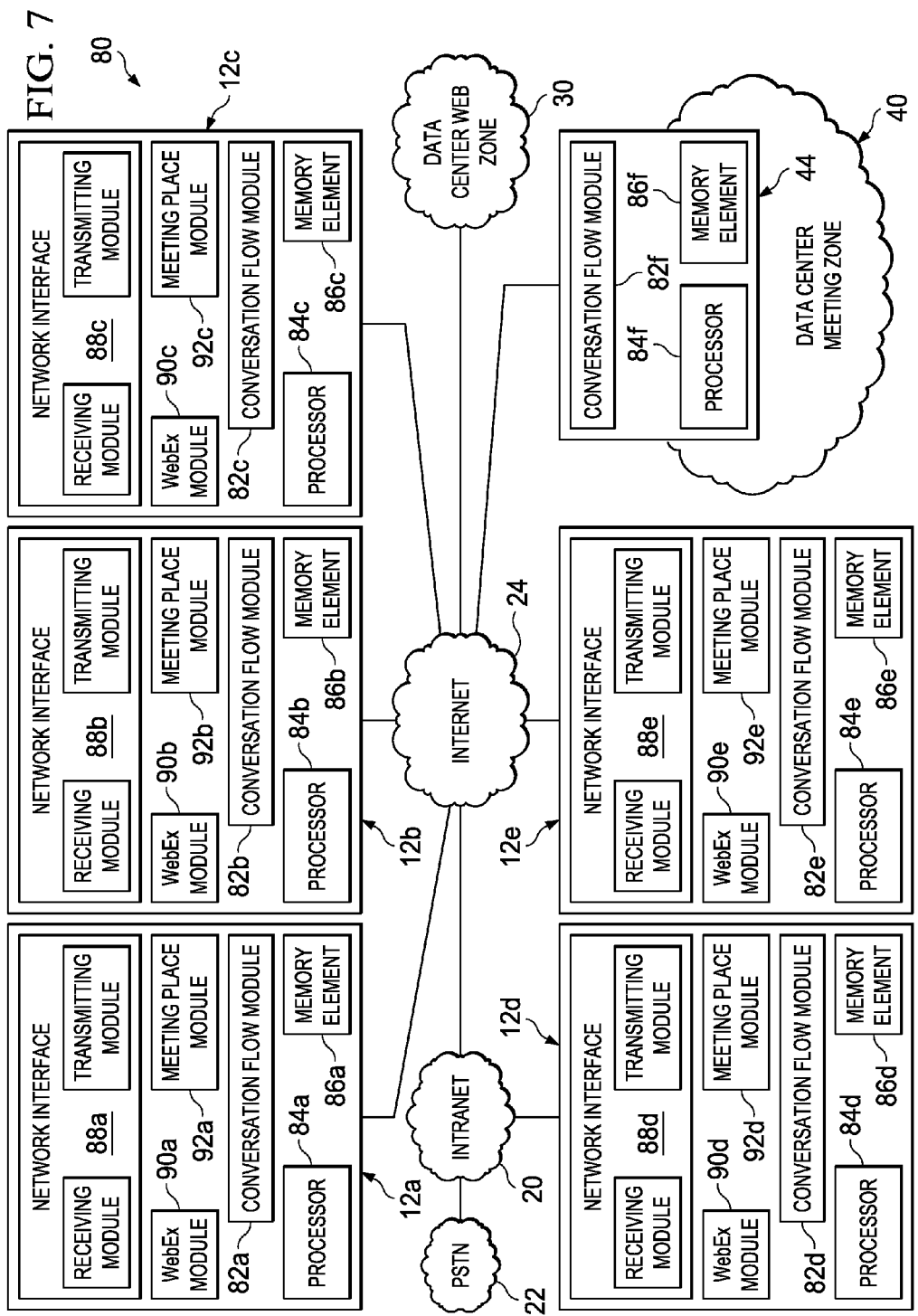

SYSTEM AND METHOD FOR MANAGING CONVERSATIONS FOR A MEETING SESSION IN A NETWORK ENVIRONMENT

TECHNICAL FIELD

This disclosure relates in general to the field of communications and, more particularly, to managing conversations for a meeting session in a network environment.

BACKGROUND

In certain architectures, service providers and/or enterprises may seek to offer sophisticated online conferencing services for their end users. The conferencing architecture can offer an "in-person" meeting experience over a network. Conferencing architectures can also deliver real-time interactions between people using advanced visual, audio, and multimedia technologies. Virtual meetings and conferences have an appeal because they can be held without the associated travel inconveniences and costs. In addition, virtual meetings can provide a sense of community to participants who are dispersed geographically. In certain meeting scenarios, host controls may become important. For example, some issues have arisen in conferencing scenarios when meeting participants fail to listen to each other, or systematically talk over each other. The inability to listen to others inhibits collaboration and stymies productivity for employees who participate in online meetings. Hence, optimizing conversation flows presents a significant challenge to web developers, meeting hosts, and managers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7 is a simplified schematic diagram illustrating possible details related to an example infrastructure of the communication system in accordance with one embodiment.

DETAILED DESCRIPTION OF EXAMPLE EMBODIMENTS

Overview

A method is provided in one example embodiment and includes establishing a communication session involving a first endpoint and a second endpoint associated with a meeting in a network environment. The first endpoint is associated with a first identifier and the second endpoint is associated with a second identifier. The method also includes designating the first endpoint as a speaking leader for a segment of the communication session, the second endpoint operates in a listening mode while the first endpoint operates as the speaking leader. The method also includes rendering a symbol indicative of the first endpoint being the speaking leader for the segment. The symbol and the first identifier are associated on a user interface.

In more specific implementations, the symbol can be rendered adjacent to the first identifier, which is provided on the user interface of the first endpoint. Additionally, a host for the meeting enables a transitioning of the symbol between endpoints involved in the meeting. The host can be configured to alert the second endpoint of infractions of the listening mode. [Note that any task done by the host could be automated using various computer systems.] In yet other examples, once the first endpoint is designated as the speaking leader for the segment of the communication session, audio data for other endpoints involved in the meeting are muted (or audio capabilities could be disabled). The method can also include receiving a request from a third endpoint to receive a subsequent designation to be the speaking leader; and positioning a third identifier associated with the third endpoint in a speaker queue that is viewable by other endpoints involved in the meeting. The symbol can be transitioned to a next endpoint in the speaking queue after a designated time interval.

Example Embodiments

Figure 1:
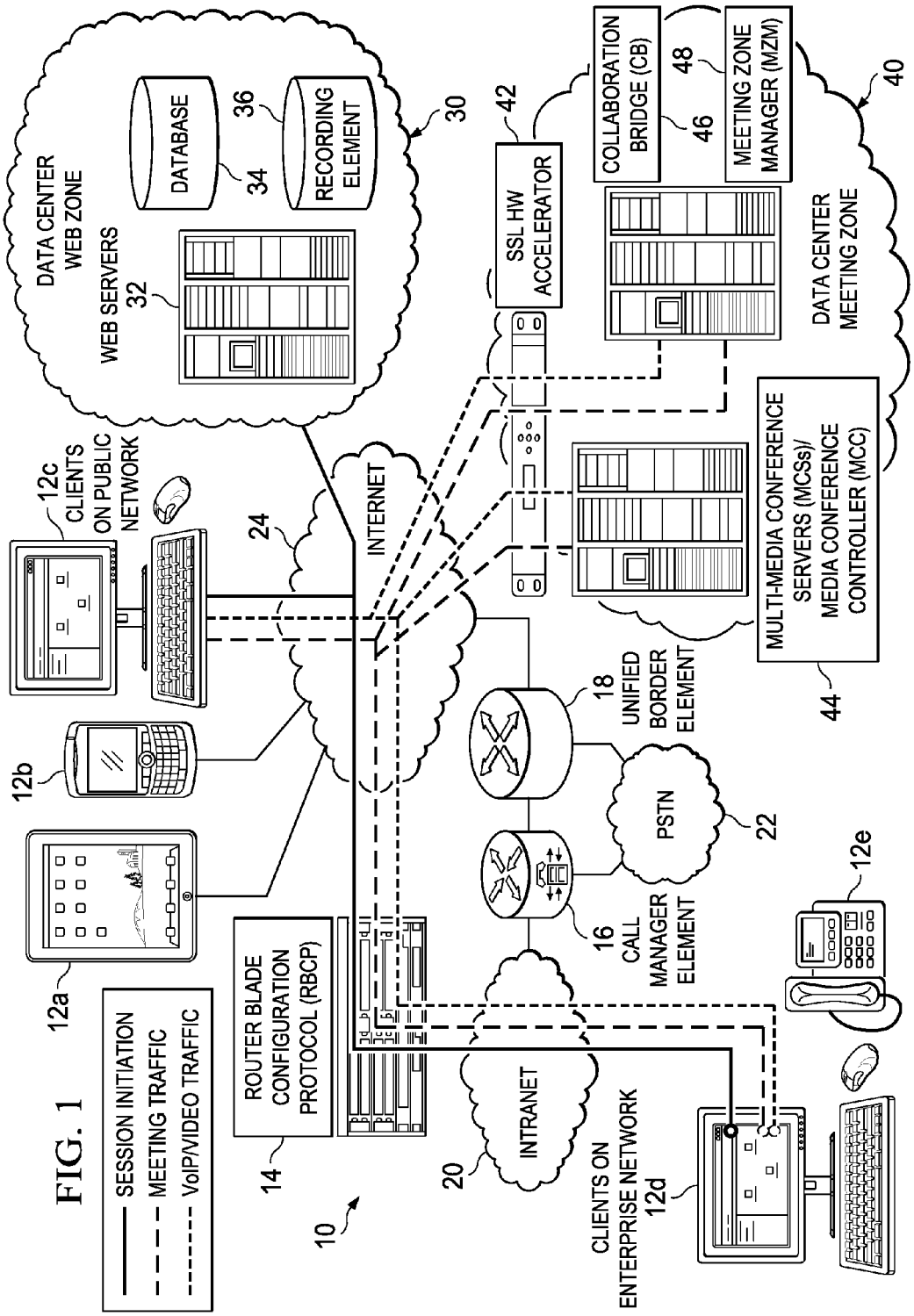
FIG. 1 is a simplified schematic diagram of a communication system for managing a conversation in accordance with one embodiment of the present disclosure.

Turning to FIG. 1, FIG. 1 is a simplified block diagram illustrating a communication system 10 for managing conversations in a network environment in accordance with one embodiment of the present disclosure. Communication system 10 may include a number of endpoints 12a-e that can achieve suitable network connectivity via various points of attachment. In this particular example, communication system 10 includes an Intranet 20, a public switched telephone network (PSTN) 22, and an Internet 24, which (in this particular example) offers a pathway to a data center web zone 30 and a data center meeting zone 40.

Data center web zone 30 includes a plurality of web servers 32, a database 34, and a recording element 36. Data center meeting zone 40 includes a secure sockets layer hardware (SSL HW) accelerator 42, a plurality of multimedia conference servers (MCSs)/media conference controller (MCC) 44, a collaboration bridge 46, and a meeting zone manager 48. As a general proposition, each MCS can be configured to coordinate video and voice traffic for a given online meeting. Additionally, each MCC can be configured to manage the MCS from data center meeting zone 40.

Note that various types of routers and switches can be used to facilitate communications amongst any of the elements of FIG. 1. For example, a call manager element 16 and a unified border element 18 can be provisioned between PSTN 22 and Intranet 20. Also depicted in FIG. 1 are a number of pathways (e.g., shown as solid or broken lines) between the elements for propagating meeting traffic, session initiation, and voice over Internet protocol (VoIP)/video traffic.

Before turning to the operational flows and infrastructure of example embodiments of the present disclosure, a brief overview of a typical meeting environment is provided for the audience, along with basic discussions associated with talking stick models. The following information is offered earnestly for teaching purposes only and, therefore, should not be construed in any way to limit the broad scope of the present disclosure. The concept of a 'talking stick' has been used for centuries by many American Indian tribes to enhance the organization of group dialogues and, further, to engender impartial hearing.

A typical talking stick was a ceremonial item: decorated with ornamentation to indicate its significance. Commonly, the talking stick was used in council circles to designate a right to speak. When matters of great concern came before the council, the leading elder of the council would hold the talking stick to moderate the discussion. As much as anything, the talking stick was a symbolic gesture of courtesy to prohibit the interruption of the council leader (e.g., an Indian chief) when he was speaking.

Logistically, whoever held the talking stick also held the sacred power of words. Only that person would speak while he held the stick; the other council members refrained from speaking. When a leader completed his soliloquy, he could solicit questions, and then subsequently hold out the talking stick for its next bearer. Whoever wished to speak after the leader would take the talking stick and naturally assume the role of observed speaker. In this manner, the stick was passed from one individual to another until all who wished to speak had done so. At the conclusion of the discussions, the talking stick was customarily passed back to the leading elder for safekeeping.

Much like other symbols of authority (e.g., a headdress, a peace pipe, a wampum belt, a sacred shell, etc.) the talking stick carried a respect for free speech, along with an inherent honoring of listening to a fellow community member. Possession of the talking stick assured the speaker that he had the freedom and power to say what was in his heart without fear of reprisal, interruption, or humiliation. In modern times, a talking stick can be used by many groups, especially in groups of children or adults who need help in preventing discussions from degenerating into cacophonies. The talking stick can ensure that people listen to what is being said and, further, it can help keep a discussion more focused.

In an online meeting environment, mutual understanding is a fundamental part of any conversation. In typical meeting scenarios, participants are eager to share their opinions, voice their agenda, and convey their thoughts. Unfortunately, participant zealousness inhibits an orderly meeting. For example, in online meeting scenarios, discussions can quickly regress into a chaotic exchange amongst participants. Listening is lost in such chaos, where participants are simply vying for the next feasible opportunity to speak.

In accordance with the teachings of the present disclosure, communication system 10 can overcome the aforementioned deficiencies (and others) in offering a talking stick mechanism to facilitate an orderly discussion for online meetings. The talking stick mechanism can limit interruptions and, further, effectively moderate live meeting discussions. In practice, the talking stick tool can enable participants to speak uninterrupted and, moreover, intelligently guide the conversation without the need to be the designated presenter, host, etc.

In one particular example, the talking stick mechanism may be provisioned in conjunction with a WebEx platform to facilitate a more orderly online meeting. For example, the talking stick tool can be implemented in conjunction with WebEx ball scenarios, which designate certain parties as a presenter during a given time interval of the online meeting. It is imperative to note that the talking stick mechanism of the present disclosure is not limited to a WebEx protocol, as the talking stick mechanism is equally applicable to any type of online conference scenario.

In operation of an example scenario, the host of the online meeting can enable or disable the talking stick feature for a particular meeting. A talking stick icon (e.g., similar to the ball icon) can be displayed next to the person directing the conversation. Initially, and in the context of one non-limiting example, the person holding the ball can also be the person owning the talking stick. The talking stick holder is the main speaker, whereas the other individuals in the conference are only allowed to ask questions to seek a better understanding of the topic, or to seek a clarification of the speaker's viewpoints. In this general sense, those endpoints not in possession of the talking stick are operating in a listening mode.

In a particular example, the talking stick holder can elect when to release the talking stick to other individuals in the meeting. In other instances, the host of the meeting can be responsible for performing this transfer. Additionally, the stick holder can signal to the other participants if they violate talking stick usage rules. For example, meeting participants who do not honor the listening mode of the talking stick model may receive flashing icons, colors, sounds, etc. to alert them of their infractions. The platform can automatically do this (e.g., using speech recognition, audio detection mechanisms, etc.), or the host can initiate these alerts, or (alternatively) peers can self-monitor/self-report each other in order to provide these alerts.

The meeting host can readily reassign the talking stick if (and when) appropriate. Participants in the conference can request the right to possess the talking stick, where the order of the requests (e.g., the on-deck order of participants to possess the talking stick) can be viewed by everyone attending the online meeting. In other cases, a predefined talking stick schedule can be circulated to the meeting participants before the meeting commences (e.g., as part of a roll call protocol). Hence, a talking stick listing can be pre-populated before the meeting commences. In this sense, individuals would know who would be on deck for receiving the talking stick. By default, the released talking stick can go to the next requestor in the queue. The host can also decide how many people can circulate the talking stick before it returns back to the presenter.

It should be noted that any designated individual can manipulate the system interface in order to control the talking stick designation. As mentioned previously, a default could be provided as the host being the individual that controls any talking stick transfers during the online meeting. In other scenarios, a presenter can automatically be given this right while he is presenting, where the control would pass back to the host after the presenter has completed his discussion, presentation, activities, etc. In alternative scenarios, multiple individuals of a team can simultaneously be given the talking stick designation. Other teams would honor the listening mode, while the designated team presented their opinion, information, presentation, etc. In still other arrangements, priority settings (e.g., manager vs. subordinate, etc.) can be used to initially control the talking stick designations for the meeting. In certain scenarios, a timer can be set for anyone possessing the talking stick (e.g., 5 minutes, 2 minutes, 30 minutes, etc.) such that the talking stick would revert to another participant at time expiration. Other scenarios could include any type of round-robin talking stick assignment, or the talking stick order could be tied to speech frequency parameters (e.g., active members would be slated to speak next, or inactive speakers would be slated to speak next to solicit their opinions, etc.). Any number of these possibilities could readily be accommodated by communication system 10, or different combinations of such parameters could be employed. Additional details relating to the possible signaling and interactions between the components of communication system 10 are provided below with reference to FIGS. 2-7.

Figure 2:
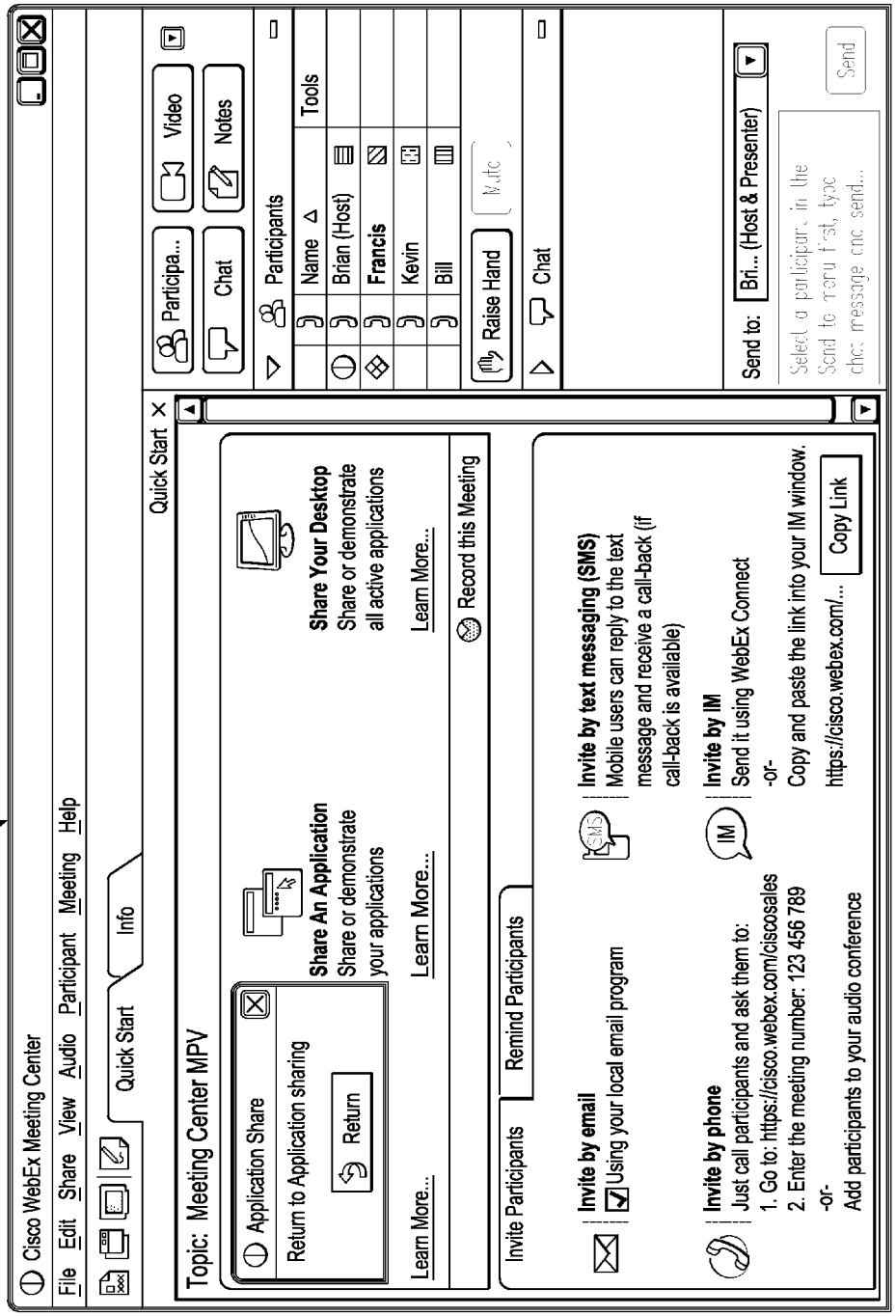
FIGS. 2-5 are simplified schematic diagrams illustrating example user interface graphics associated with possible implementations of the communication system.
Figure 3:
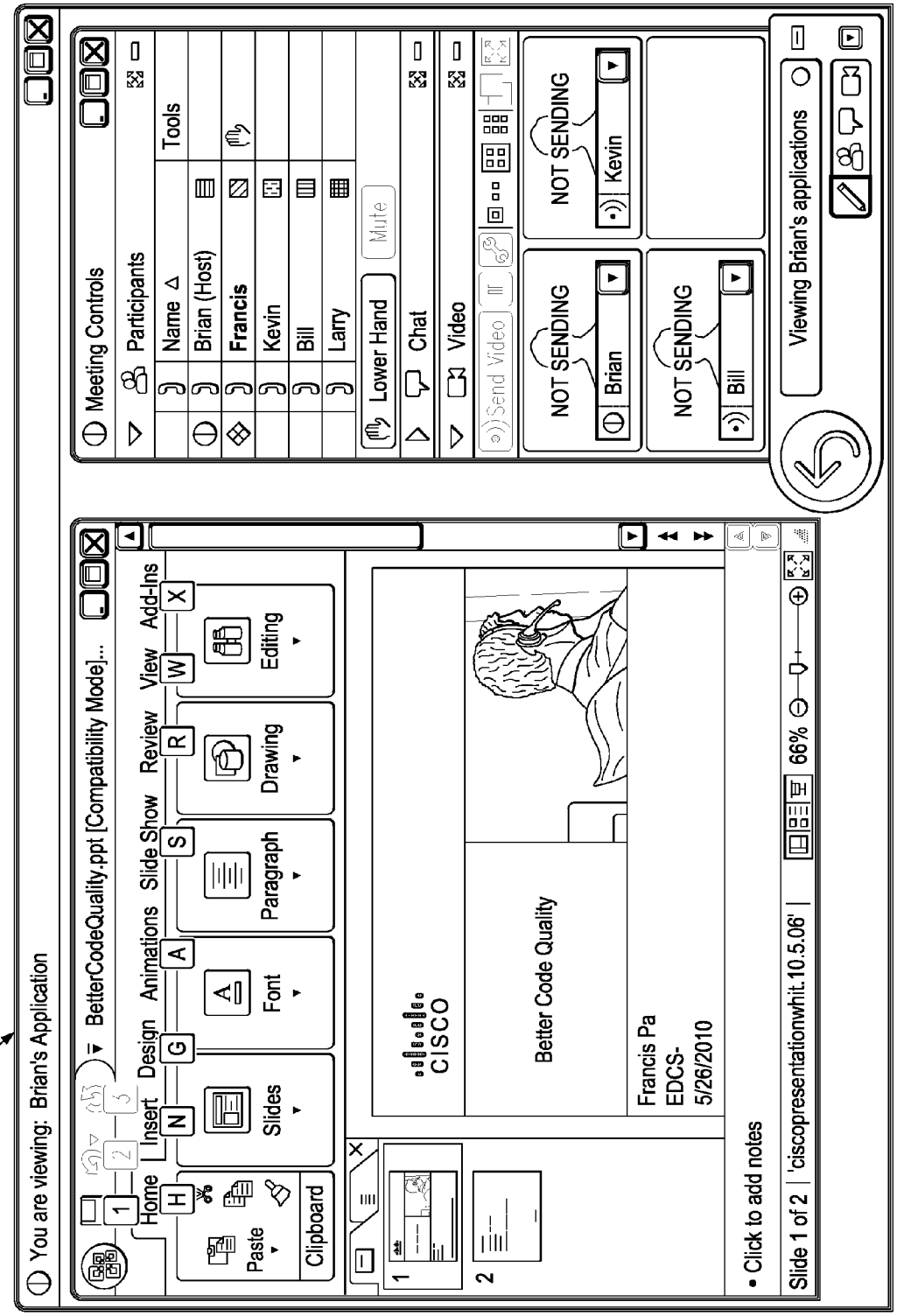

FIGS. 2-5 are simplified schematic diagrams illustrating example user interface graphics associated with one possible implementation of communication system 10. Turning specifically to FIG. 2, FIG. 2 is a simplified schematic diagram 50 associated with an example webpage for conducting an online meeting. This particular example relates to a WebEx meeting initiation, specifically as the online meeting experience begins. FIG. 3 is a simplified schematic diagram 55 illustrating one example scenario in which a particular meeting participant is sharing a PowerPoint presentation during a WebEx meeting. This participant can freely share his desktop such that other meeting participants can observe information that is resident on his local machine.

Semantically, WebEx is a web-based client and server application. A client module can be loaded onto an end user's endpoint via one or more webpages. A software module (e.g., a plug-in) can be delivered to a respective endpoint via the webpages. The plug-in can be downloaded (or suitably updated) before participating in the meeting. If the software module is already resident on the end user's endpoint (e.g., previously downloaded, provisioned through any other type of medium (e.g., compact disk (CD)), then while attempting to participate in an online meeting, that software module would be called to run locally on the endpoint. This allows a given endpoint to establish a communication with one or more servers (e.g., provisioned at data center meeting zone 40 and/or data center web zone 30).

Static data can be stored in data center web zone 30. For example, the scheduling data, the login information, the branding for a particular company, the schedule of the day's events, etc. can all be provided in data center web zone 30. Once the meeting has begun, any meeting experience information can be coordinated (and stored) in data center meeting zone 40. For example, if an individual were to share a document, or to pass the ball, then that meeting experience would be managed by data center meeting zone 40. In a particular implementation, data center meeting zone 40 is configured to coordinate the talking stick activities with endpoints 12a-e (e.g., via software modules). Details concerning that possible implementation are described below with reference to FIG. 7.

Figure 4:
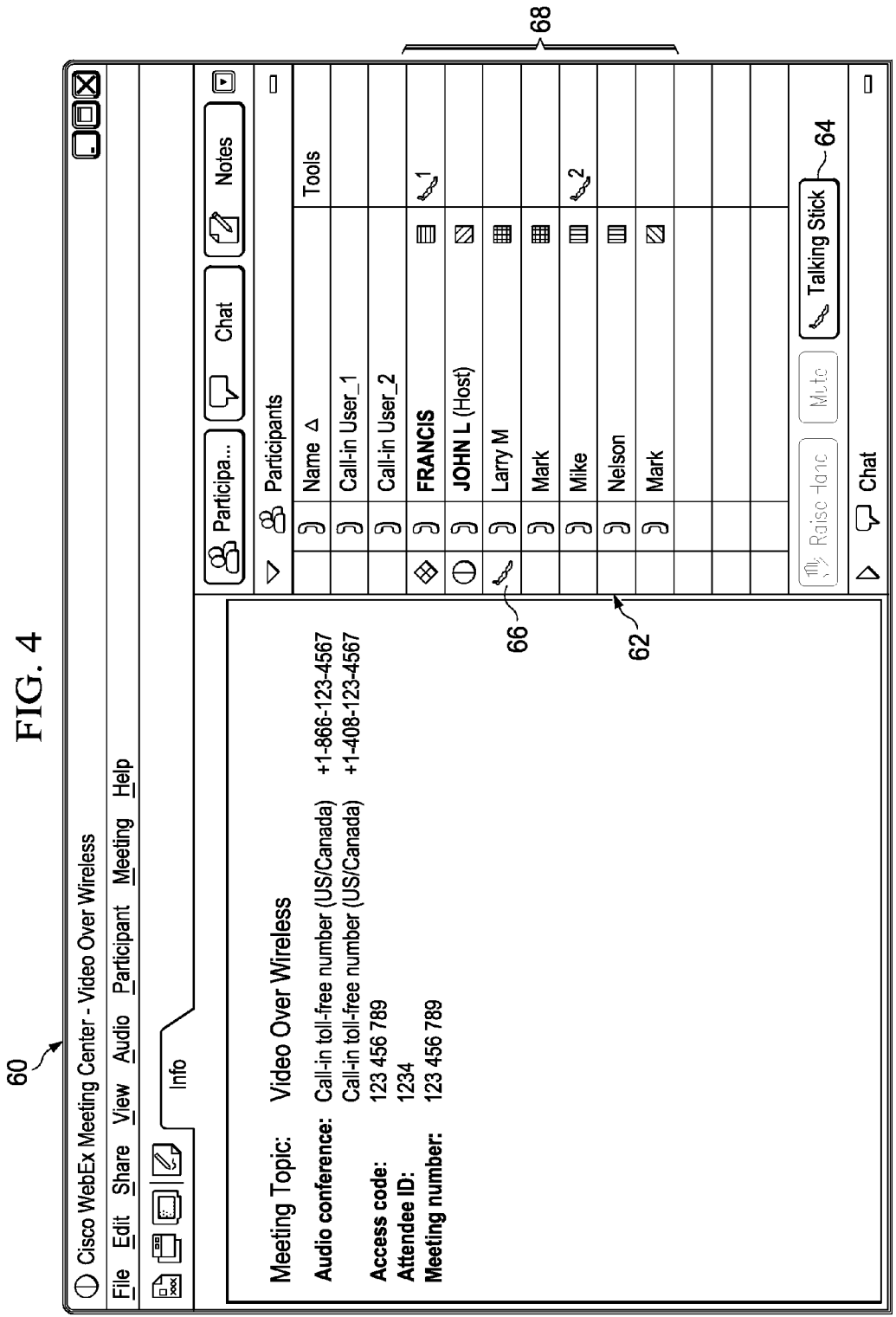

Turning to FIG. 4, FIG. 4 is a simplified schematic diagram 60 illustrating one possible implementation of the talking stick mechanism discussed herein. A talking stick paradigm can be incorporated into online meeting scenarios and, further, be provisioned in a WebEx meeting environment in particular implementations of the present disclosure. In the particular example of FIG. 4, a participant listing 62 is being illustrated, along with a talking stick soft button 64 and a designated talking stick icon 66. Additionally, FIG. 4 includes a talking stick queue 68, which allows the meeting participants to see the upcoming speakers, who will soon possess the talking stick.

The talking stick mechanism of communication system 10 can be viewed as a respected symbol for the person talking, while other meeting participants are tasked with listening (e.g., or probing for clarification, details, etc.). To this end, the participants can readily use hand-raising features of an online meeting (e.g., depicted in FIG. 5). Hence, the meeting participants are active listeners that may ask questions; however, they would be forbidden from changing topics, or from discussing different matters when another individual is designated as holding the talking stick. As used herein in this Specification, the term 'listening mode' is meant to connote that endpoints are honoring the talking stick paradigm: allowing the designated speaking leader to speak uninterrupted while the designated speaking leader holds the talking stick (e.g., the designated symbol indicative of the talking stick). [Note that the term 'symbol' as used herein in this Specification includes any type of shape, art, graphic, picture, icon, indicia, number, label, letter, alphanumeric combination, or any other suitable distinguishing element or object.] Any interactions involving the other meeting participants would relate directly to the topic being discussed by the talking stick leader.

In operation, passing the talking stick is not necessarily the same paradigm as passing the ball in an online meeting (e.g., a WebEx meeting) because the person holding the stick is not necessarily the presenter. Instead, the person holding the talking stick is simply the person expressing his ideas and, further, controlling the direction of the conversation. In a particular example, the host of the online meeting enables and controls the talking stick feature. Individuals holding the stick would have the right to speak during the meeting, while others would be listening, or asking questions relevant to the topic being discussed.

Although it is expected that the individuals participating in the meeting would honor the talking stick protocol, the host can enforce muting rules if people are not listening, veering off-topic, etc. Furthermore, there could be settings that automatically mute individuals for a configurable time (e.g., a penalty-box scenario) when violations occur. In addition, in an alternative embodiment, all meeting participants can be systematically muted when not in possession of the talking stick. In an example implementation, the host of a given meeting is provisioned as the default host, presenter, and moderator for the talking stick, the ball, etc. The host can then move any of these items (or management responsibilities) to other meeting participants.

Operationally, FIG. 4 highlights how individuals participating in the meeting can readily identify subsequent speakers in talking stick queue 68. In this particular example, Larry is holding the talking stick, while Francis and Mike occupy positions #1 and #2 respectively in the queue. As Larry finishes his discussion, he can relinquish talking stick icon 66 (or the host can make this transfer) via talking stick soft button 64. Talking stick soft button 64 enables talking stick icon 66 to be passed to Francis, who is next in line to speak. As a result, Mike would then occupy the #1 slot in talking stick queue 68. The system is configured to automatically update the order of talking stick queue 68 and, further, update the icon next to the individuals who are about to speak. Hence, the system is configured to associate a user identifier (e.g., a login name, an e-mail address, a proper name, an avatar, etc.) of the endpoint to the talking stick designation.

Figure 5:
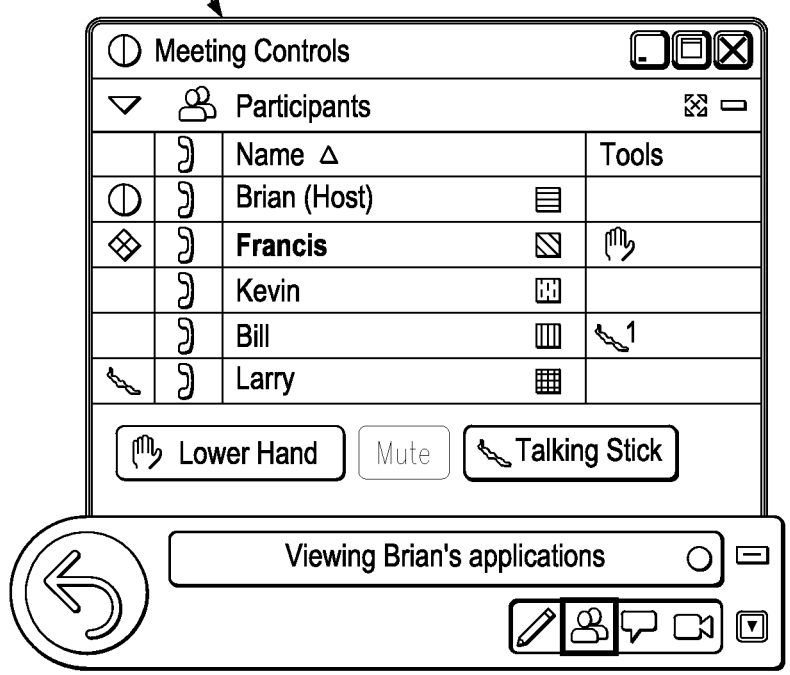

FIG. 5 is a simplified screenshot 70 illustrating one possible implementation of the talking stick mechanism. In this particular example, Brian is operating as the host for the meeting and Larry is holding the talking stick. Bill will be speaking next, as shown in the talking stick queue (and by the small icon number next to the talking stick graphic). Because Brian is the host, he may change the order of the talking stick queue for any reason, or adhere to its current settings. For example, although Bill is slated to speak next, Brian may (in his judgment) elect to prevent the talking stick from being passed to Bill. Hence, as the moderator, Brian is empowered to deny transitions for the talking stick, where appropriate. In certain cases, the talking stick may automatically be prohibited from being passed if the subsequent speaker in the talking stick queue has violated designated rules (e.g., violated the listening mode, and the system has identified those infractions). For example, if Bill had received a visual warning (while Larry was presenting his ideas), and if Bill did not adhere to the warning, the system could automatically reorder the queue such that Bill would be skipped over for receiving the talking stick.

Figure 6:
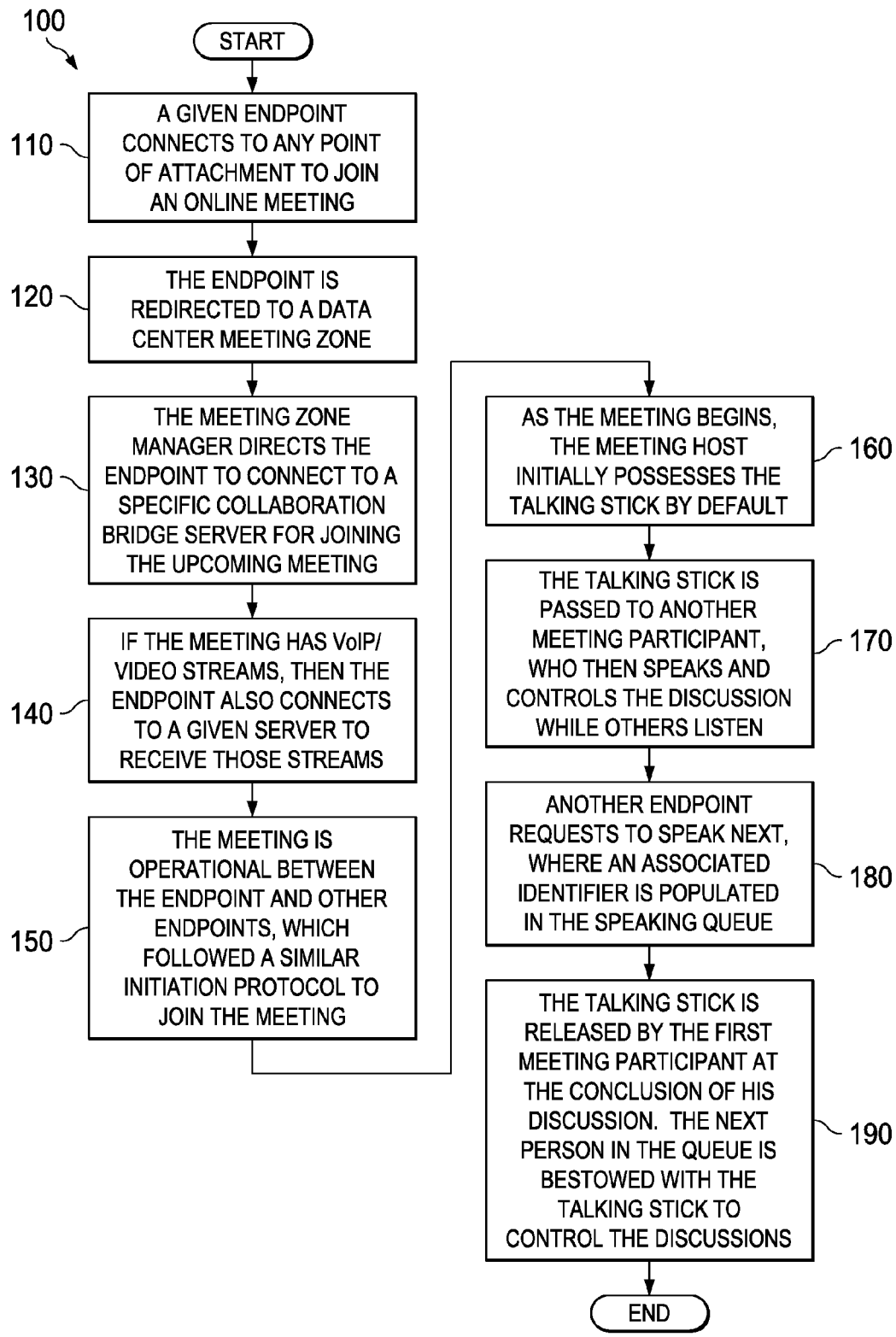
FIG. 6 is a simplified flowchart illustrating a series of example activities associated with the communication system.

FIG. 6 is a simplified flowchart 100 illustrating one possible set of activities associated with the present disclosure. In this particular example, the meeting participants are utilizing the talking stick mechanism during an online meeting. The method may begin at 110, where a given endpoint connects to any point of attachment in order to initiate joining an online meeting. Hence, a given client (e.g., a WebEx client) can perform appropriate operations to join a previously scheduled WebEx meeting.

At 120, the endpoint can be redirected to data center meeting zone 40 (as shown in FIG. 1). At 130, meeting zone manager 48 can direct the endpoint to connect to a specific collaboration bridge server for joining the upcoming meeting. At 140, if the meeting has VoIP/video streams, then the endpoint also connects to a given server (e.g., an MCS) to receive those streams. At 150, the meeting would be operational between the endpoint and other endpoint devices, which followed a similar initiation protocol to join the meeting.

Operationally, when the client joins the online meeting (e.g., and launches integrated voice and video) there are two connections being established to the collaboration bridge and to the MCS. For the collaboration bridge, one connection is established to send data and a second connection is established to receive data. For the MCS, one connection is established for control and the second connection is established for data. At 160, as the meeting begins, the meeting host may initially possess the talking stick by default. At 170, the talking stick is passed to another meeting participant (Francis), who then speaks and controls the discussion while others enter a listening mode. Other meeting participants interested in speaking (after Francis) can place a request to the host (or autonomously to the system via a soft button) in order to be positioned in a suitable queue for speaking next. This is illustrated by 180, where an associated identifier is populated in the speaking queue. Hence, others can see that this user is about to speak next based on the queue that is visible to the meeting participants. The system is associating the talking stick mechanism (e.g., the designated speaking leader) to an identifier of the endpoint. The identifier can be the user ID used to login to the meeting, or any other suitable identifier (e.g., a symbol, a proper name, a picture, a unique graphic, etc.).

At 190, the talking stick is released by the first meeting participant (Francis) at the conclusion of his discussion. The next person in the queue would be bestowed with the talking stick (i.e., the speaking leader designation), affording him the right to speak to the group, while others would enter the listening mode (possibly asking relevant questions at appropriate times). A suitable transcript (i.e., digitally recorded) that memorialized each talking stick segment could be sent to participants at the conclusion of the meeting.

FIG. 7 is a simplified block diagram illustrating one possible example of infrastructure associated with communication system 10. Each of endpoints 12a-e are provisioned with a respective conversation flow module 82a-e, a respective processor 84a-e, a respective memory element 86a-e, a respective WebEx module 90a-e, a respective Meeting Place module 92a-e, and a respective network interface 88a-e, which includes a respective receiving module and a respective transmitting module for exchanging data (e.g., for exchanging packets in a network environment). Additionally, FIG. 7 illustrates an example implementation of MCSs/MCC 44 that is similarly provisioned with a conversation flow module 82f, a processor 84f, and a memory element 86f.

In one example implementation, each endpoint 12a-e and/or MCSs/MCC 44 includes software (e.g., as part of conversation flow modules 82a-f) to achieve or to support the talking stick functions, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of the FIGURES may include any suitable algorithms, hardware, software, components, modules, interfaces, or objects that facilitate these talking stick operations.

It is imperative to note that FIG. 7 is indicative of just one, of the multitude, of example implementations of communication system 10. Any of the modules or elements within endpoints 12a-e and/or MCSs/MCC 44 may readily be replaced, substituted, or eliminated based on particular needs. Furthermore, although described with reference to particular scenarios, where a given module (e.g., WebEx module 90a-e, Meeting Place module 92a-e, conversation flow module 82a-e, etc.) is provided within endpoints 12a-e or MCSs/MCC 44, any one or more of these elements can be provided externally, or consolidated and/or combined in any suitable fashion. In certain instances, certain elements may be provided in a single proprietary module, device, unit, etc. in order to achieve the teachings of the present disclosure.

Endpoints 12a-e are representative of any type of client or user wishing to participate in a meeting session in communication system 10 (e.g., or in any other online platform). Furthermore, endpoints 12a-e can be associated with individuals, clients, customers, or end users wishing to participate in a meeting session in communication system 10 via some network. The term 'endpoint' is inclusive of devices used to initiate a communication, such as a computer, a personal digital assistant (PDA), a laptop or electronic notebook, a cellular telephone of any kind, an iPhone, an IP phone, a Blackberry, a Google Droid, an iPad, a tablet, or any other device, component, element, or object capable of initiating voice, audio, video, media, or data exchanges within communication system 10. Endpoints 12a-e may also be inclusive of a suitable interface to the human user, such as a microphone, a display, or a keyboard or other terminal equipment. Endpoints 12a-e may also be any device that seeks to initiate a communication on behalf of another entity or element, such as a program, a proprietary conferencing device, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

MCSs/MCC 44 and web servers 32 are network elements that manage (or that cooperate with each other in order to manage) aspects of a meeting session. As used herein in this Specification, the term 'network element' is meant to encompass any type of servers (e.g., a video server, a web server, etc.), routers, switches, gateways, bridges, loadbalancers, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, MCSs/MCC 44 and web servers 32 are servers that can interact with each other via the networks of FIG. 1.

Intranet 20, PSTN 22, and Internet 24 represent a series of points or nodes of interconnected communication paths for receiving and transmitting packets of information that propagate through communication system 10. These networks may offer connectivity to any of the devices or endpoints of FIG. 1. Moreover, Intranet 20, PSTN 22, and Internet 24 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 20, PSTN 22, and Internet 24 can support a transmission control protocol (TCP)/IP, or a user datagram protocol (UDP)/IP in particular embodiments of the present disclosure; however, Intranet 20, PSTN 22, and Internet 24 may alternatively implement any other suitable communication protocol for transmitting and receiving data packets within communication system 10. Note also that Intranet 20, PSTN 22, and Internet 24 can accommodate any number of ancillary activities, which can accompany a meeting session. This network connectivity can facilitate all informational exchanges (e.g., notes, virtual whiteboards, PowerPoint presentations, e-mailing, word-processing applications, etc.). Along similar reasoning, Intranet 20, PSTN 22, and Internet 24 can foster all such communications and, further, be replaced by any suitable network components for facilitating the propagation of data between participants in a conferencing session.

It should also be noted that endpoints 12a-e and MCSs/MCC 44 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location is responsible for certain activities associated with talking stick operations. In a general sense, the arrangement depicted in FIG. 7 may be more logical in its representations, whereas a physical architecture may include various permutations/combinations/hybrids of these elements.

Note that in certain example implementations, the talking stick functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 7) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 7) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, conversation flow modules 82a-f include software in order to achieve the talking stick functions outlined herein. These activities can be facilitated by MCSs/MCC 44 and/or the various endpoints 12a-f. MCSs/MCC 44 and/or endpoints 12a-f can include memory elements for storing information to be used in achieving the intelligent talking stick functions, as outlined herein. Additionally, MCSs/MCC 44 and/or endpoints 12a-f may include a processor that can execute software or an algorithm to perform the talking stick controls, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of rooms and sites, as well as more complicated/sophisticated arrangements and configurations. Accordingly, the examples provided herein should not limit the scope or inhibit the broad teachings of communication system 10 as potentially applied to a myriad of other architectures. Additionally, although described with reference to particular scenarios where MCSs/MCC 44 resides in a particular physical location, MCSs/MCC 44 can reside in any location, provided it has some connectivity to a suitable network.

It is also important to note that the steps discussed with reference to FIGS. 1-7 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in WebEx and Meeting Place conferencing environments or arrangements, the present disclosure may be used in any online environment that could benefit from such technology. For example, in certain instances, computers that are coupled to each other in some fashion can utilize the teachings of the present disclosure (e.g., even though participants would be in a face-to-face arrangement). The talking stick paradigm could still be respected by those meeting participants: even when they are physically co-located. Virtually any configuration that seeks to intelligently control conversations and discussions could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method comprising:
   establishing a communication session involving a plurality of endpoints comprising a first endpoint, a second endpoint and at least a third endpoint associated with a meeting in a network environment, the first endpoint being associated with a first identifier and the second endpoint being associated with a second identifier;
   designating the first endpoint as a speaking leader for a segment of the communication session, wherein the second endpoint operates in a listening mode while the first endpoint operates as the speaking leader;
   rendering a symbol indicative of the first endpoint being the speaking leader for the segment, wherein the symbol and the first identifier are associated on a user interface;
   placing the second endpoint in a speaking queue with the plurality of endpoints, wherein the speaking queue sorts an order for subsequent designations as the speaking leader;
   detecting an infraction of the listening mode by the second endpoint through voice recognition;
   automatically alerting the second endpoint of the infraction of the listening mode; and
   automatically reordering the position of the second endpoint in the speaking queue in response to detecting the infraction.

2. The method of claim 1, wherein the symbol is rendered adjacent to the first identifier, which is provided on the user interface.

3. The method of claim 1, further comprising designating a third endpoint of the meeting as a host, the host being configured to begin the meeting at a designated time, transition the symbol between the plurality of endpoints in the speaking queue, and alert the second endpoint of the infractions of the listening mode.

4. The method of claim 1, wherein once the first endpoint is designated as the speaking leader for the segment of the communication session, audio data for other endpoints of the plurality of endpoints are muted.

5. The method of claim 1, further comprising:
   receiving a request from a third endpoint to receive a subsequent designation to be the speaking leader; and
   positioning a third identifier associated with the third endpoint in the speaking queue that is viewable by other endpoints involved in the meeting.

6. The method of claim 5, wherein the symbol is automatically transitioned to a next endpoint in the speaking queue after a designated time interval.

7. The method of claim 1, wherein automatically reordering the position of the second endpoint in the speaking queue comprises placing the second endpoint at an end of the speaking queue.

8. Logic encoded in non-transitory media that includes code for execution and when executed by a processor operable to perform operations comprising:
   establishing a communication session involving a plurality of endpoints comprising a first endpoint, a second endpoint, and at least a third endpoint associated with a meeting in a network environment, the first endpoint being associated with a first identifier and the second endpoint being associated with a second identifier;
   designating the first endpoint as a speaking leader for a segment of the communication session, wherein the second endpoint operates in a listening mode while the first endpoint operates as the speaking leader;
   rendering a symbol indicative of the first endpoint being the speaking leader for the segment, wherein the symbol and the first identifier are associated on a user interface;
   placing the second endpoint in a speaking queue with the plurality of endpoints, wherein the speaking queue sorts an order for subsequent designations as the speaking leader;
   detecting an infraction of the listening mode by the second endpoint through voice recognition;
   automatically alerting the second endpoint of the infraction of the listening mode; and
   automatically reordering the position of the second endpoint in the speaking queue in response to detecting the infraction.

9. The logic of claim 8, wherein the symbol is rendered adjacent to the first identifier, which is provided on the user interface.

10. The logic of claim 8, the operations further comprising designating a third endpoint of the meeting as a host, the host being configured to begin the meeting at a designated time, transition the symbol between the plurality of endpoints in the speaking queue, and alert the second endpoint of the infractions of the listening mode.

11. The logic of claim 8, wherein once the first endpoint is designated as the speaking leader for the segment of the communication session, audio data for other endpoints of the plurality of endpoints are muted.

12. The logic of claim 8, the operations further comprising:
    receiving a request from a third endpoint to receive a subsequent designation to be the speaking leader; and
    positioning a third identifier associated with the third endpoint in the speaking queue that is viewable by other endpoints involved in the meeting.

13. The logic of claim 12, wherein the symbol is automatically transitioned to a next endpoint in the speaking queue after a designated time interval.

14. The logic of claim 8,
    wherein the operation of automatically reordering the position of the second endpoint in the speaking queue comprises placing the second endpoint at an end of the speaking queue.

15. An apparatus comprising:
    a memory element configured to store electronic code,
    a processor operable to execute instructions associated with the electronic code, and
    a flow module configured to interface with the processor and further configured for:
    establishing a communication session involving a plurality of endpoints comprising a first endpoint, a second endpoint, and at least a third endpoint associated with a meeting in a network environment, the first endpoint being associated with a first identifier and the second endpoint being associated with a second identifier;
    designating the first endpoint as a speaking leader for a segment of the communication session, wherein the second endpoint operates in a listening mode while the first endpoint operates as the speaking leader;

rendering a symbol indicative of the first endpoint being the speaking leader for the segment, wherein the symbol and the first identifier are associated on a user interface;

placing the second endpoint in a speaking queue with the plurality of endpoints, wherein the speaking queue sorts an order for subsequent designations as the speaking leader;

detecting an infraction of the listening mode by the second endpoint through voice recognition;

automatically alerting the second endpoint of the infraction of the listening mode; and automatically reordering the position of the second endpoint in the speaking queue in response to detecting the infraction.

16. The apparatus of claim 15, wherein the symbol is rendered adjacent to the first identifier, which is provided on the user interface.

17. The apparatus of claim 15, wherein a third endpoint of the meeting is designated as a host, the host being configured to begin the meeting at a designated time, transition the symbol between the plurality of endpoints in the speaking queue, and alert the second endpoint of the infractions of the listening mode.

18. The apparatus of claim 15, wherein once the first endpoint is designated as the speaking leader for the segment of the communication session, audio data for other endpoints of the plurality of endpoints are muted.

19. The apparatus of claim 15, wherein the apparatus is further configured for:

receiving a request from a third endpoint to receive a subsequent designation to be the speaking leader; and positioning a third identifier associated with the third endpoint in the speaking queue that is viewable by other endpoints involved in the meeting, wherein the symbol is automatically transitioned to a next endpoint in the speaking queue after a designated time interval.

20. The apparatus of claim 15, wherein the symbol includes a term 'stick' as part of its rendering on the user interface.

21. The apparatus of claim 15, wherein the flow module is configured for automatically reordering the position of the second endpoint in the speaking queue comprising placing the second endpoint at an end of the speaking queue.

* * * * *